(12) United States Patent
Fan

(10) Patent No.: US 7,773,803 B2
(45) Date of Patent: Aug. 10, 2010

(54) EFFECTIVE CODING OF PAGE BOUNDARY FOR MRC/MECCA SEGMENTATION

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1099 days.

(21) Appl. No.: 11/431,978

(22) Filed: May 11, 2006

(65) Prior Publication Data
US 2007/0263261 A1 Nov. 15, 2007

(51) Int. Cl.
*G06K 9/34* (2006.01)
(52) U.S. Cl. ........................ 382/164; 382/173
(58) Field of Classification Search ................. 382/173, 382/302, 226, 240, 255, 263, 180, 270, 162, 382/164; 375/E7.081, E7.076, E7.086; 345/636; 358/462, 2.1, 464, 1.9; 715/853, 848; 283/37, 283/38, 39; 707/E17.12
See application file for complete search history.

(56) References Cited
U.S. PATENT DOCUMENTS
6,244,628 B1 * 6/2001 Muller ........................ 283/38
6,577,762 B1 * 6/2003 Seeger et al. ................. 382/173
6,744,452 B1 * 6/2004 McBrearty et al. .......... 715/853

OTHER PUBLICATIONS
U.S. Appl. No. 10/866,850, filed Jun. 14, 2003, Zhigang Fan.

* cited by examiner

*Primary Examiner*—Anh Hong Do
(74) *Attorney, Agent, or Firm*—Fay Sharpe LLP

(57) ABSTRACT

A method and system is provided for segmenting scanned image data in accordance with mixed raster content processing for more efficient processing of non-uniform color page borders. A first processing method partitions the border so that resulting segments can be coded efficiently by cutting the border into segments along cut lines disposed in optimum position for minimizing a total area of bounding boxes for the page border segments. Another embodiment determines the color variance within the page border window and compares the variance against predetermined color variance threshold. A window width of the page border window is also determined and compared with a predetermined width threshold. When the variance and window widths are smaller than the thresholds, a uniform color is assigned to the non-uniform color page border and the border is coded in accordance with a foreground layer compression algorithm.

14 Claims, 3 Drawing Sheets

EFFECTIVE CODING OF PAGE BOUNDARY FOR MRC/MECCA SEGMENTATION

The subject development relates generally to image segmentation, and particularly to a method to process scanned data representative of a document image wherein portions of the image are better detected for retrieving more efficient storage and high reconstructive image quality. More particularly, a method and system is proposed for more efficient coding of non-uniform page borders by either segmenting the border or approximating its color to a uniform one.

BACKGROUND

The present exemplary embodiments are directed to methods for image segmentation to produce a mixed raster content ("MRC") image with multiple extracted constant color areas ("MECCA"). MRC modeling is a powerful image representation concept in achieving high compression ratios while maintaining high constructed image quality. MECCA modeling has the further advantages of relatively undemanding reconstruction requirements and inherent text enhancement and noise reduction features. The MECCA model contains one background layer, N foreground layers, and N mask layers where N is a non-negative integer. While the background layer can be a contone bitmap, the foreground layers are restricted to constant colors. U.S. Ser. No. 10/866,850 entitled "Method for Image Segmentation to Identify Regions with Constant Foreground Color", filed Jun. 14, 2003 hereby incorporated by reference in its entirety, details a relevant MECCA modeling method.

The segmenting of the data into either background or foreground text is important because different compression algorithms are much more efficient for different kinds of images. For example, JPEG or other lossy compression algorithms are more efficient compression for pictures while other algorithms (CCITT G4 or LZW) are especially designed for binary images like text. Using different compression algorithms for different portions of the scanned image data provides the advantage of a high compression ratio for the data with high quality image reconstruction.

To generate MRC/MECCA representation for an image, segmentation is required. The segmentation algorithm generally consists of four steps, namely object extraction, object selection, color clustering, and result generation. In the first step, text and other objects are extracted from the image. Next, the objects are tested for color constancy and other features to decide if they should be represented in the foreground layers. The objects that are chosen are then clustered in color space as the third step. The image is finally segmented such that each foreground layer codes the objects from the same color cluster.

When the object candidates for foreground layers are first extracted, the clustering is performed to determine how many foreground layers are needed and how each object should be represented therein. There are currently two kinds of color clustering approaches for object representation: pixel based and object based. In the pixel based approach, clustering analysis is performed on pixel colors. As the objects are usually very noisy, the neighboring pixels within one object may often be grouped into different clusters and represented in different foreground layers. This results in very low coding efficiency. The object based approach is currently more prevalent and the clustering is performed on objects instead of pixels. This ensures grouping consistency within an object. Consequently, much higher coding efficiency can be achieved. However, the object based approach requires the object to be constant (at least visually) in color. A color uniformity check is thus required before the clustering.

The remaining parts of the image that cannot be coded in the foreground layers, including the regions of non-uniform colors and the page background, are coded in the background layers. If the background layer has to be coded for an entire page, the background layer coding will likely be undesirably inefficient as it may contain significant redundancy. First, the areas of the image that are defined by the foregrounds do not carry any background coding information. Second, white is the normal default color for a background, hence a white page background does not need to be coded.

In practice, when a page is scanned, a scanning window may not exactly match the precise page border. If the scanning window is slightly larger, a small portion of the scanner cover may appear in the scanned image. Conventionally, these areas are called "page borders". The colors of the page borders depend on the scanner cover. Keeping in mind that a page border may only be a portion of the entire perimeter of the scanned page. If the color in the page border area varies, it may be segmented as a contone window and compressed in JPEG.

Although the page border is usually narrow and occupies only a very small area of the overall page, to code it in a straightforward manner may require a disproportionatelly large amount of bits. This is because JPEG codes rectangular areas. To cover a non-rectangular area, the entire area that is specified by its bounding box needs to be coded. For page border areas, the bounding box could be much larger. Quite often, it may extend to almost an entire page.

Accordingly, there is a need for a processing method and system which avoids present inefficient processing techniques of page borders in a background layer.

SUMMARY

An MRC/MECCA segmentation system and method are provided which more efficiently codes the non-uniform color page borders. More particularly, the page border is partitioned so that it is comprised of a plurality of segments, and the resulting segments can be windowed in bounding boxes in a manner to provide much more efficient coding in a background layer compression algorithm. Alternatively, a non-uniform color page border window is determined whether it can be approximated as a uniform color object, and if so, is then coded in with a foreground layer compression algorithm.

In accordance with the present embodiments, a method is disclosed for processing scanned data representative of a document image wherein the data is segmented in a contone background layer and a uniform color foreground layer. A non-uniform color page border is identified and partitioned into a plurality of page border segments. The page border segments can be more efficiently coded as background layer segments. Identifying the border comprises detecting the page border window touching at least two sides of an image border of the document image. The partitioning may more particularly comprise segmenting the page border window into M segments, wherein M is the number of the sides of the image border that the page border window touches. The partitioning may also comprise determining a cut line for the page border, wherein the cut line is disposed in an optimum position for minimizing a total area of bounding boxes for the page border segments.

Another embodiment may avoid the partitioning of the non-uniform page border by approximating a non-uniform color page border with a uniform color page border. In accordance with this embodiment, the non-uniform color page border is identified as being bounded by a page border window. The color variance within the page border window is determined and the variance is compared against a predetermined color variance threshold. The window width of the page border window is also determined and compared against a predetermined window width threshold. When the color variances is less than the predetermined color variance threshold and the window width is smaller than the window width threshold, a uniform color is assigned to the non-uniform color page border window so that the page border can be coded in the foreground layer with a foreground layer compression algorithm.

A xerographic system for so processing scanned data includes a processor for identifying a non-uniform color page border, a partitioner for partitioning the page border into a plurality of page border segments defined by selective cut lines disposed for minimizing a total area of bounding boxes for the page border segments and a coder for coding the scanned data corresponding to the page border segments with a compression algorithm for the background layer. Alternatively, the processor will determine the color variance within the page border window and a window width of the page border window for comparison with a predetermined color variance threshold and a predetermined window width threshold, respectively. When the processor determines that the color variance is less than the color variance threshold and the window width is smaller than the window width threshold, the processor assigns a uniform color to the non-uniform color page border and the coder codes the page border in the foreground layer with the compression algorithm for the foreground layer.

DETAILED DESCRIPTION

The subject developments relate to segmenting scanned data for achieving high compression ratios and good reconstruction image quality. As noted above, different types of scanned data can be more efficiently compressed in accordance with different types of compression algorithms. The slowly varying scanned image data portions (contone, pictures) of the image are better compressed by picture compression algorithms like JPEG. Transitions between the text and the background are better compressed by binary compressors. Accordingly, the segmentation process is basically to segment the image into several layers so that the layers carrying slowly varying information are compressed by picture compressor algorithms, while the layers carrying the sharp transitions are compressed by binary compressor algorithms.

Figure 1:
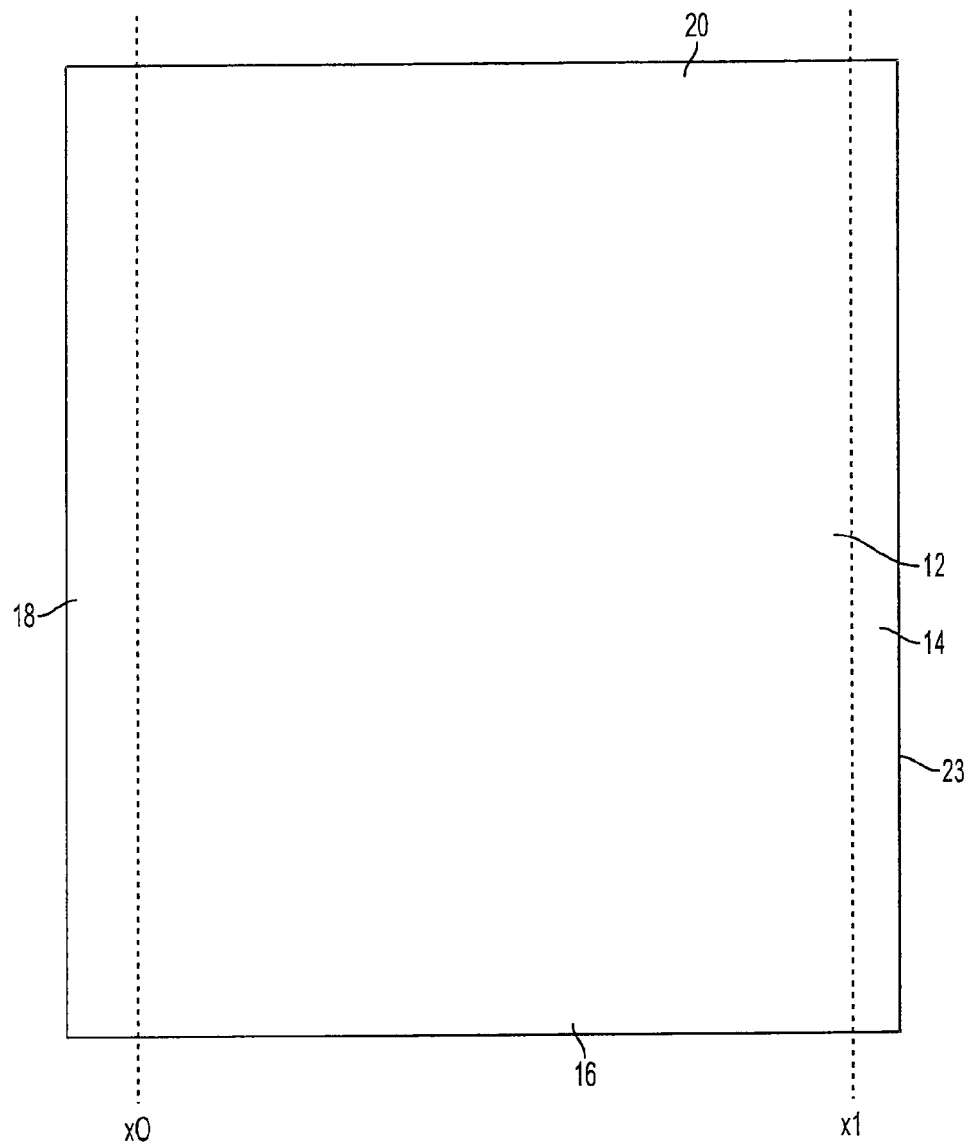
FIG. 1 is an exemplar of a scanned document including a non-uniform color page border.

A special problem occurs for scanned text documents comprised of non-uniform color page borders. As noted above, when a page is scanned, the scanning window may not exactly match the page border. FIG. 1 shows a document page 10 having a white background 12 but also having a frame of a non-uniform color border including segments 14, 16, 18, 20 which can frequently occur during a scanning process (text and other components of the document in background area 12 have been omitted for simplicity sake). Relative to the area of the page 10, the page border segments 14, 16, 18, 20 are relatively narrow and occupy only a very small area, but the bounding box (assuming a JPEG coding) for the page border extends over the entire page 10. Non-uniform color page borders may only extend about a portion of the frame of the document page 10, so that as far as concerned herein, by "page border" is meant any portion or segment of the bounding frame of the document 10.

Figure 2:
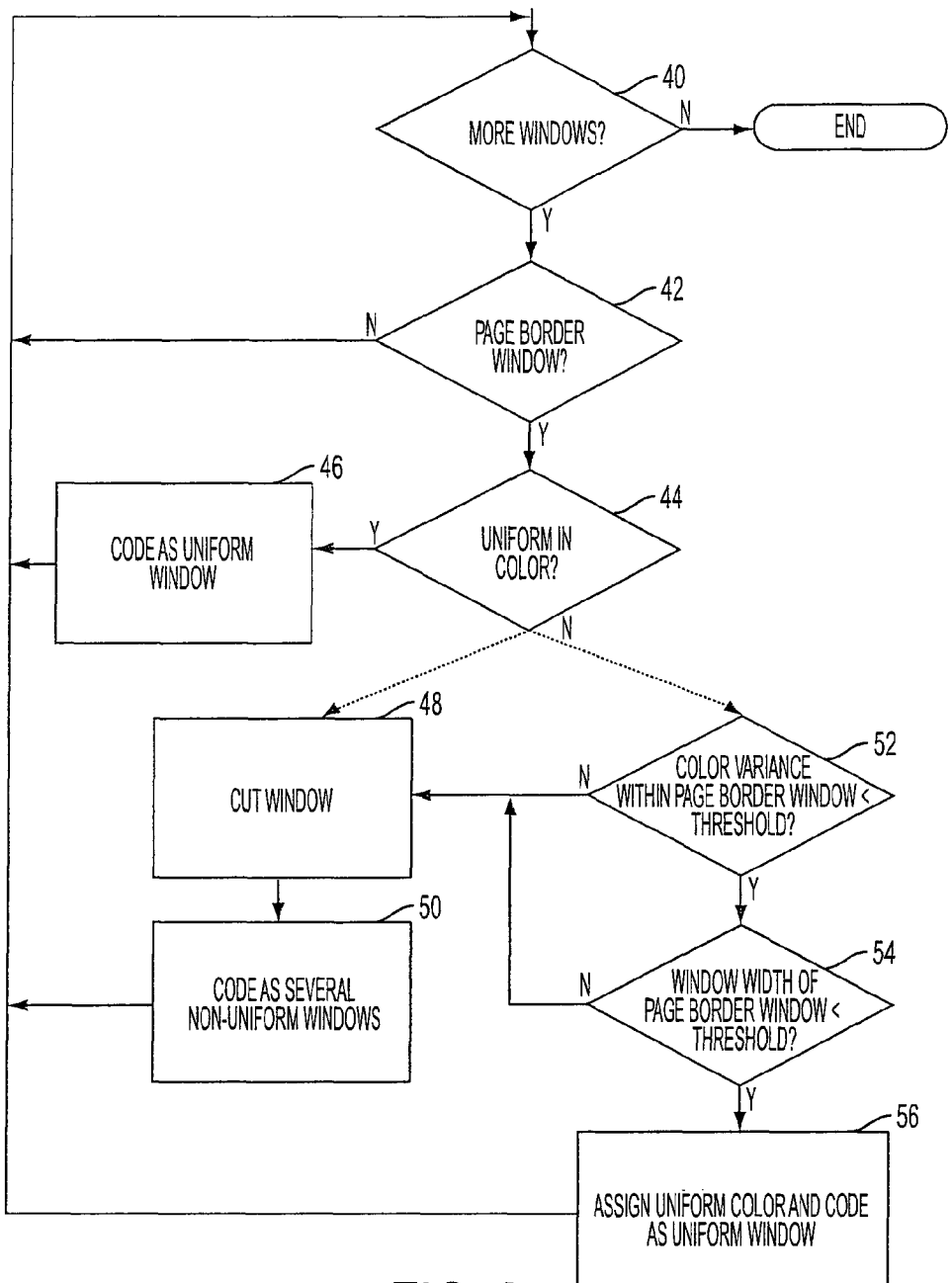
FIG. 2 is a flowchart of an embodiment of a processing method for improved MECCA segmentation of a non-uniform color page border.
Figure 3:
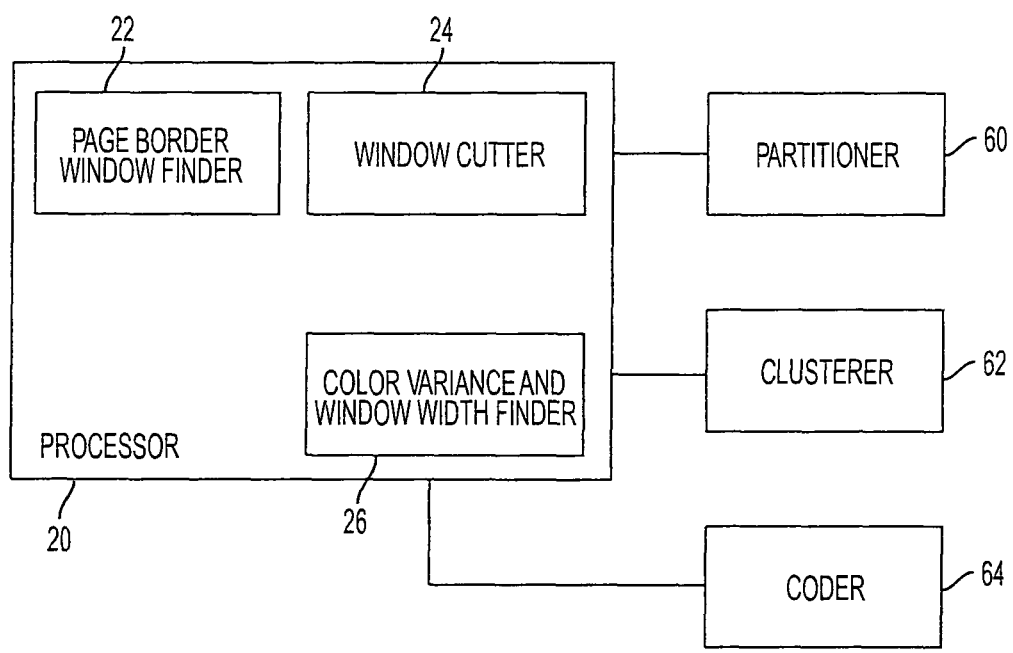
FIG. 3 is a block diagram of a system for MECCA segmentation of a non-uniform color page border, based upon segmenting the page border for measuring color variance within the border and the width of the page border window.

With reference to FIGS. 2 and 3, processor 210 first identifies if there are any bounding page border windows by first assessing all possible windows 40 in the scanned data and then determining whether or not each window is a page border window 22, 42. If the window is uniform in color 44, it can be coded 46 in accordance with normal MECCA processing of a uniform color object with a binary compression algorithm in the foreground layer. However, if it is not uniform in color, then one of two alternative page border processing methods for a more efficient coding can be employed. The first alternative method is based on the observation that if a page border is partitioned into long narrow segments, the total area of the associated bounding boxes may become much smaller. With reference to FIG. 1, it can be seen that the page border is partitioned by cut lines x0, x1 into the four segments 14, 16, 18, 20.

More particularly, a contone window is detected as a page border window if it touches substantially (more than N pixels, where N is a preset threshold) at least two sides of the image borders (a window that touches only one side of the image border usually can be coded efficiently without the subject special method processing). Each detected page border window is then partitioned 24, 48 into M segments, where M is the number of sides that the window (substantially) touches. When M is four (or two), two (or one) cuts are needed. When M is three, one or two cuts is required, depending on direction. Although for a particular image, partition in a vertical or horizontal direction may result in different total areas of bounding boxes, the difference is usually not significant. The optimum position of partition may be obtained by minimization of the total areas of the resulting bounding boxes. For example, and with reference to FIG. 1, the page border window bounding box is the outer perimeter 23. If a vertical partition is assumed for M=4, as shown in FIG. 1, the cutting points x0 and x1 can be calculated as:

$$\text{Min}[x0+(W-x1)]H+(x1-x0)[H_T(x0, x1)+H_B(x0, x1)]$$

where W and H are the width and height of the image, $H_T(x0, x1)$ and $H_B(x0, x1)$ are the heights of the bounding boxes for top and bottom segments if the image is cut at x0 and x1. The minimization is over x0 and x1, with $x_{00} \leq x0 < x1 \leq x_{11}$, where $x_{00}$ and $x_{11}$, are the smallest x0 and largest x1 that will partition the window into four segments. Thus, the partitioning is intended to comprise a dividing of the page border for forming rectangular page border segments generally of long narrow blocks defined by cut lines wherein the cut lines are disposed at an optimum position for minimizing a total area of bounding boxes for the page border segments. After the partitioning, the segments can be coded 50 as several non-uniform color window objects in the background with a background layer compression algorithm (e.g. JPEG).

Another embodiment comprising a processing method for improved compression and reconstruction of a non-uniform color page border window is to approximate the non-uniform color page border window with a uniform one. Lossless coding methods such as CCITTT G4 may code uniform windows with great efficiency. This method is only possible if the variation in the color of the page border window is not too large, and the borders are narrow. In such a case, one may assume that the variation is merely due to noise so that the classifying of the window as a uniform color does not run much risk of losing information.

After a non-uniform color page border window has been identified 44 the processor 20 next finds the color variance and window width. Each window is checked 52 to see if its color variance is smaller than a predetermined threshold. Such a threshold is determined based on many factors, such as color space of the image, image quality requirements and user preferences. If not, then it may be segmented as above, or conventionally processed with a conventional background layer compression algorithm. However, if the variance is below the predetermined threshold, then it is next checked to see if the widest part of the window is also smaller than a predetermined threshold 54. If both these conditions are satisfied, then the window is assigned a uniform color 56 and coded as a uniform window. If the color of the page border window is close to the page background, it may also be classified as part of a white page background. However, this may discard page border information, which may be valuable for some users.

With reference to FIG. 3, in addition to the processor 20 which performs the special processing steps identified above, a xerographic system for processing scanned data in the subject mixed raster content segmented representations includes the partitioner 60 for partitioning the page border into a plurality of page border segments defined by the selected cut lines disposed for minimizing a total area of bounding boxes for the page border segments. A clusterer 62 is disposed for clustering like colored border segments with other objects in the foreground layer and a coder 64 codes the scanned data corresponding to the page border segments with the compression algorithm for the background layer or the foreground layer, depending upon whether the segmenting method, and color variance and width processing method is selected.

The claims can encompass embodiments in hardware, software, or a combination thereof.

The word "scanner" as used herein encompasses any apparatus, such as a digital copier, bookmaking machine, facsimile machine, multi-function machine, etc. which performs a document reading function for any purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing scanned data representative of a document image comprising:
    segmenting the data into a contone background layer and uniform color foreground layer;
    identifying a non-uniform color page border by processor implentation;
    partitioning the non-uniform page border into a plurality of page border segments;
    coding the page border segments as a background layer segment.

2. The method of claim 1 wherein the partitioning comprises dividing the page border for forming rectangular page border segments.

3. The method of claim 2 wherein the rectangular page border segments comprise long, narrow blocks.

4. The method of claim 1 wherein the identifying the border comprises detecting a page border window touching at least two sides of an image border of the document image.

5. The method of claim 4 wherein the partitioning the page border comprises segmenting the page border window into M segments, where M is a number of the sides of the image border that the page border window touches.

6. The method of claim 1 wherein the partitioning comprises determining a cut line for the page border and wherein the cut line is disposed at an optimum position for minimizing a total area of bounding boxes for the page border segments.

7. The method of claim 6 wherein the partitioning comprises segmenting the page border into M page border segments, and wherein M=4, first and second cutting points x0 and x1, respectively, are calculated as:

$$\text{Min}[x0+(W-x1)]H+(x1-x0)[H_T(x),x1]+H_B(x0,x1)]$$

where W and H are the width and height of the document image, respectively, and $H_T$ (x0, x1) and $H_B$ (x), X1) are the heights of the bounding boxes for a top and a bottom page border segments.

8. A method for processing scanned data representative of a document image for achieving high storage compression ratios by approximating a non-uniform color page border window with a uniform color page border window, comprising:
    segmenting the data into a contone background layers and a uniform color foreground layers;
    identifying a non-uniform color page border bounded by a page border window by processor implementation;
    determining a color variance within the page border window and comparing the variance against a predetermined color variance threshold;
    determining a window width of the page border window and comparing the width against a predetermined window width threshold; and
    when the color variance is less than the predetermined color variance threshold and the window width is smaller than the window width threshold, assigning a uniform color to the non-uniform color page border and coding the page border in the foreground layer.

9. The method of claim 8 wherein if a color of the page border window is close to a page background white color, coding the page border in the background layer as white page background.

10. A xerographic system for processing scanned data in mixed raster content segmented representation, including a background layer and a foreground layer, and for respectively storing corresponding background and foreground data in distinct compression algorithms; comprising:
    a processor for identifying a non-uniform color page border;
    a partitioner for partitioning the page border into a plurality of page border segments defined by selected cut lines disposed for minimizing a total area of bounding boxes for the page border segments, and,
    a coder for coding the scanned data corresponding to the page border segments with the compression algorithm for the background layer.

11. The system of claim 10 wherein the processor further:
    bounds the non-uniform color page border with a page border window;
    determines a color variance within the page border window and compares the variance against a predetermined color variance threshold;

determines a window width of the page border window and compares the width against a predetermined window width threshold; and when the processor determines that the color variance is less than the color variance threshold and the window width is smaller than the window width threshold, the processor assigns a uniform color to the non-uniform color page border and the coder codes the page border in the foreground layer with the compression algorithm for the foreground layer.

12. The system of claim 11 wherein when the processor determines that the color variance is less than the color variance threshold, or the window width is smaller than the window width threshold, the partitioner is inhibited from the partitioning of the page border, and the coder is inhibited coding the page border segments.

13. The system of claim 10 wherein the processor identifies the color page border by detecting a page border window touching at least two sides of an image border of the document image.

14. The system of claim 13 wherein the partitioner partitions the page border by segmenting the page border window into M segments, where M is a number of the sides of the image border that the page border window touches.

* * * * *